Jan. 15, 1952  I. PEYCHES  2,582,561
APPARATUS FOR THE PRODUCTION OF FIBERS, IN
PARTICULAR GLASS FIBERS
Filed Sept. 21, 1945  2 SHEETS—SHEET 1

Inventor
Ivan Peyches

Inventor
IVAN PEYCHES

Patented Jan. 15, 1952

2,582,561

UNITED STATES PATENT OFFICE 2,582,561

APPARATUS FOR THE PRODUCTION OF FIBERS, IN PARTICULAR GLASS FIBERS

Ivan Peyches, Paris, France, assignor to Societe Anonyme des Manufactures des Glaces et Produits Chimiques de Saint-Gobain, Chauny & Cirey, Paris, France Application September 21, 1945, Serial No. 617,934
In France June 4, 1943

Section 1, Public Law 690, August 8, 1946
Patent expires June 4, 1963

4 Claims. (Cl. 18—2.6)

My invention relates to apparatus for the drawing of viscous materials into fibres, whether such materials are of mineral or organic origin. It refers particularly to apparatus for the production of glass fibres.

In the manufacture of such fibres the action of the centrifugal force has already been used, the viscous material to be transformed into fibres being brought to a rotating body. Under the action of said centrifugal force, the viscous material is projected out of the rotating body in the form of streams and such streams are drawn into fibres of a small diameter.

It has already been proposed to add to the centrifugal force the action of a gaseous current acting on the glass streams. In the known processes such gaseous current consists of an air sheet striking, either from above or from beneath, the plane containing the projected glass streams.

I ascertained that the drawing effect of such gaseous current on the projected streams is much smaller than might have been expected considering the speed given to said gaseous current.

My invention has for its object an apparatus enabling one to obtain a much more efficient drawing action by means of a gaseous current.

My invention consists in bringing the blowing air simultaneously above and beneath the plane containing the glass streams issued from the rotating body, so that the two upper and lower air currents are converging towards one another and meet practically in the plane containing the projected glass streams.

Preferably the directions of such two currents are symmetrical in relation to the plane of the glass streams, i. e. in relation to the plane perpendicular to the rotation axis of the rotating body passing by the points on the periphery of said rotating body wherefrom the glass streams are projected.

The directions of said two currents may advantageously be inclined at a small angle in respect to said plane and may even, in some cases, be almost parallel to it. In any way the two currents will create a resulting current in the shape of a sheet, the middle plane of which coincides with the plane containing the projected glass streams.

I ascertained that, owing to the convergency of the two blowing currents and to their position on both sides of the plane containing the projected glass streams, such streams penetrate within the midst of the resulting air current formed by the junction of the two converging currents, that is to say that such glass streams are subjected to the action of the gaseous current having the greatest speed. If the two air currents are so directed that the resulting current tends to drive the glass streams away from the revolving body or to exert on said streams a traction with respect to their connection points to the revolving body, the drawing action exerted on the streams will benefit all the efficaciousness of the resulting current due to the great speed of the latter. Results are reached which were not obtained up to the present time.

The less favourable results of the prior processes in respect of the fineness of the fibres might be considered as caused by the fact that the glass streams are not reached by the part at maximum speed of the gaseous current to which they are subjected. As the sheet of air used in said processes acts on only one side of the plane containing the glass streams, such streams are generally deviated by the action of the blowing current and they have a tendency to take a direction parallel to the direction of the air current and to remain in the superficial layers of said current, i. e. at some distance from the center of same. It is known that in an air current, on account of the friction with the ambient air, the speed of the external layers is slackened; the glass streams are consequently not subjected to the action of the parts of the gaseous current having the maximum speed.

In the process according to my invention, the glass streams are unfailingly driven into the part where the two gaseous currents are converging so that said streams cannot escape the action of the most active part of the resulting current.

Another characteristic feature of my invention consists in having the glass streams coming in contact with the two blowing currents only after said glass streams have reached a certain distance from the openings through which they issue from the revolving body. In practice the outlets of the blowing nozzles themselves may be placed at a certain distance from the periphery of the revolving body. This enables to delay the moment when the blowing air begins to act on the glass streams, i. e. to delay the cooling action of the air on the glass streams. Said glass streams are thus maintained at a comparatively high temperature in a greater part of their path. It is thus possible to a certain extent to delimit two parts in each stream: the first part adjacent to the revolving body, is not subjected to the contact of the blowing air, and thus keeps a high temperature and remains consequently sufficiently plastic to be conveniently drawn, whilst the second part of the stream, in contact with the blowing air, congeals and is submitted to a pulling effect able to exert a traction on the first part and to draw it.

The characteristics and the advantages of the invention will clearly appear from the following description of an embodiment of the invention hereunder given as a mere example.

In such embodiment, the revolving body is of a type corresponding to that claimed in my co-pending application for "improvements to the production of fibres in particular glass fibres."

The flattened shape, characteristic of such revolving body, is quite suitable to enable the blowing devices to be placed on both sides of the middle plane of the revolving body perpendicular to the revolution axis and to eventually set the outlet of the blowing air nozzles in the proximity of the openings through which the glass streams are projected, i. e. in the plumb line of the projection openings.

But it must be understood that the invention is in no way limited to the use of such a type of revolving body and that it may be applied with any other revolving body used in the production of glass fibres, or other fibres.

Figure 1:
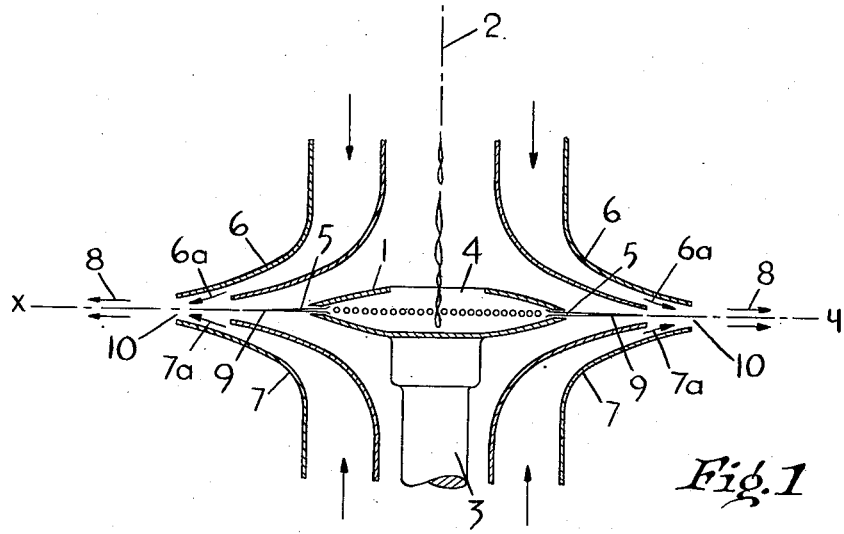
Fig. 1 is a vertical section referring to a first form of apparatus according to my invention.

On those drawings, 1 designates the hollow revolving body and 2 the revolution axis. Through driving means (pulleys, etc.) which are not shown on the drawing, a rapid revolving movement is imparted to the shaft 3 supporting the revolving body. Through the upper opening 4 of the hollow body, the latter is fed with the material to be drawn. A hot gas is sent through the interior of shaft 3 to bring to the suitable viscous state the material which, in the considered example, is glass.

The projection openings are shown at 5. They are situated at the periphery of the revolving body. The plane of the projection of the glass streams through said openings is represented by the horizontal plane x—y. At a certain distance from these openings 5, are placed two series of nozzles 6 and 7, the ones 6 above plane x—y, the others 7 beneath said plane, situated around axis 2, and by means of which blowing air jets are projected in a radial direction. The direction of the nozzles 6 and that of the nozzles 7 is slightly inclined on the plane x—y and converge towards the latter, so that the two air currents 6a and 7a, issuing from said nozzles, meet in the plane x—y, the resulting current 8 being situated practically in that plane.

9 designates a glass stream issuing from the opening 5. As shown on the figure, on an important portion of its path from the orifice 5 such stream 9 is preserved from the action of the blowing air. Later on, it penetrates into the zone 10 where the two series of blowing jets 6a and 7a are coexisting and where it is subjected to the action of said jets. Then in conformity with the hereabove explanation, it is pulled to the midst of the resulting current 8 formed by the junction of currents 6a and 7a.

Figure 2:
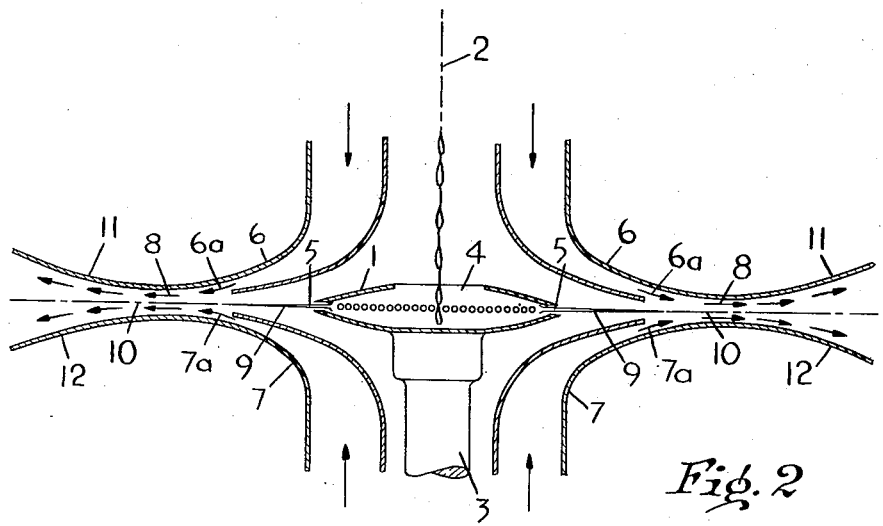
Fig. 2 is an analogous section referring to another form of apparatus.

In the form of apparatus corresponding to Fig. 2, the two gaseous currents when issuing from the nozzles 6 and 7 are guided by two surfaces 11 and 12 which canalize the resulting current after its formation and contribute to increase the maximum speed of said current.

In the two forms of apparatus which have just been described, the outlets of the blowing nozzles are placed at a certain distance from the projection openings of the centrifuging body. As hereabove stated, such arrangement is advantageous to exert a drawing action on the glass while maintaining the glass streams during a part of their path at a temperature sufficiently high to enable them to be drawn. To obtain such advantages, the distance at which such blowing outlets must be placed in relation to the projection openings, depends from the temperature of the glass stream and from its diameter when it issues from the projection opening. It will be easily understood that the higher the temperature of the issuing stream and the greater the diameter of the projection openings, the easier it will be for the glass stream to keep a sufficient plasticity during a long path; it will thus be possible to place the blowing outlets at a greater distance from the projection openings. I ascertained that with glass issuing from the revolving body at 1100° C. through projection openings of 1.4 millimeters, good results are obtained when placing the blowing outlets at about 80 millimeters from the periphery of the revolving body, in order that the blowing action should begin at approximately 100 or 150 millimeters from said periphery.

The nozzles shown in Figs. 1 and 2 direct currents in a radial direction, but without departing from the scope of my invention, such nozzles may be so directed that the resulting currents will have a tangential component or will be entirely tangential.

Figure 3:
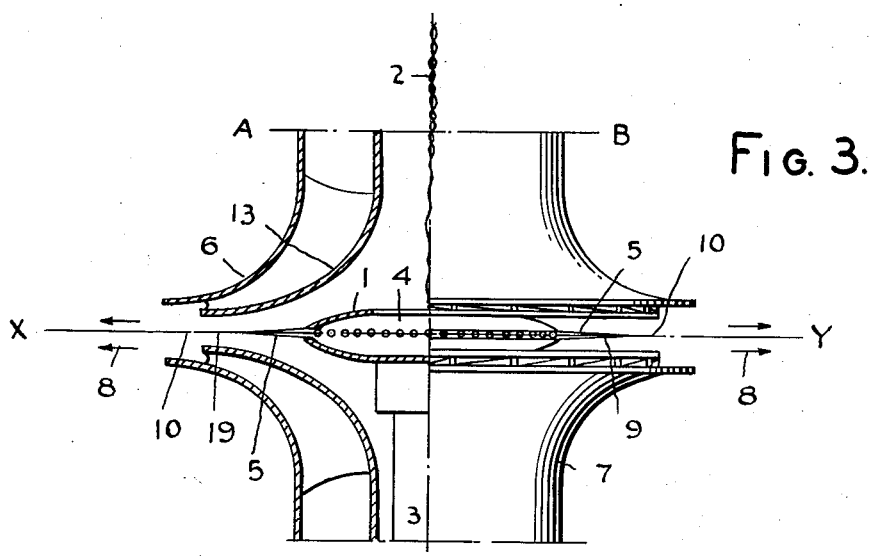
Fig. 3 is a similar view showing an arrangement according to this invention wherein the nozzles are adapted to direct current more or less tangentially.
Figure 4:
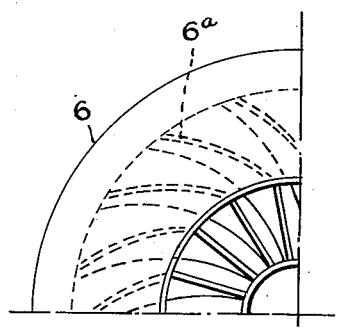
Fig. 4 is a horizontal section on line A—B thereof.

Thus I have shown in Figs. 3 and 4 vanes 6a contained within the nozzle, the lower portions of which instead of being radial are inclined thereto whereby the projected blasts of air will be more or less tangential.

It must also be understood that without departing from the scope of the invention the blowing device may be given a rotating movement concentric with that of the centrifuging body; such rotating movement may be used in particular to influence on the direction of said resulting blowing currents and this rotation may be effected in the same direction as that of the centrifuging body, or in a reverse direction.

What I claim is:

1. In an apparatus for the production of fibres from viscous material, a rotating body for receiving the viscous material and for projecting streams of said material from its periphery, two series of nozzles for blowing gaseous currents disposed concentrically to the periphery of the rotating body, one above the plane containing the projected streams and the other beneath said plane, the nozzles of each series being directed tangentially to the periphery of the rotating body and inclined towards the plane of the streams.

2. In an apparatus for the production of fibres from viscous material, a rotating body for receiving the viscous material and for projecting streams of said material from its periphery, two series of nozzles for blowing gaseous currents disposed concentrically to the periphery of the rotating body, one above the plane containing the projected streams and the other beneath said plane, the nozzle of each series having a component direction tangential to the periphery of the rotating body and being inclined towards the projection plane of the streams.

3. In a device for the production of fibres from viscous material, a rotating container for the material having peripheral perforations, blast nozzles exterior of the container and rotating with the container, said nozzles having their axes inclined toward each other at such an angle that air currents issuing therefrom will converge in the plane of the perforations.

4. In a device for the production of fibres from viscous material, a rotating container for the material having peripheral perforations, blast nozzles above and below the container rotating with the container and directing air currents converging in the plane of the perforations at a distance from the said perforations.

IVAN PEYCHES.

REFERENCES CITED

The following references are of record in the file of this patent:

UNITED STATES PATENTS

| Number | Name | Date |
| --- | --- | --- |
| 1,289,779 | Howard | Dec. 31, 1918 |
| 2,257,767 | Slayter et al. | Oct. 7, 1941 |
| 2,315,735 | Richardson | Apr. 6, 1943 |
| 2,333,218 | Von Pazsiczky | Nov. 2, 1943 |

FOREIGN PATENTS

| Number | Country | Date |
| --- | --- | --- |
| 571,807 | Germany | Feb. 16, 1933 |